(12) United States Patent
Nam

(10) Patent No.: US 7,746,397 B2
(45) Date of Patent: Jun. 29, 2010

(54) IMAGE DEVICE HAVING COLOR FILTER

(75) Inventor: Jung-Hyun Nam, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1268 days.

(21) Appl. No.: 11/269,366

(22) Filed: Nov. 8, 2005

(65) Prior Publication Data

US 2006/0103744 A1    May 18, 2006

(30) Foreign Application Priority Data

Nov. 13, 2004    (KR) .................... 10-2004-0092791

(51) Int. Cl.
*H04N 9/04*    (2006.01)

(52) U.S. Cl. ........................................ 348/280

(58) Field of Classification Search ............ None
See application file for complete search history.

(56) References Cited

U.S. PATENT DOCUMENTS 4,710,804 A    12/1987    Ide .......................... 358/48

FOREIGN PATENT DOCUMENTS

| JP | 60-032489 | 2/1985 |
| JP | 60-30722 | 9/1985 |
| KR | 1019900004033 B1 | 9/1990 |

*Primary Examiner*—Justin P Misleh
(74) *Attorney, Agent, or Firm*—F.Chau & Associates, LLC

(57) ABSTRACT

An image device comprises an image sensor including an array of photodiodes for converting an optical image into electrical signals, a color filter comprising an array of red, green and cyan filter elements disposed opposite the array of photodiodes, and a color processor for color processing the electrical signals.

6 Claims, 4 Drawing Sheets

IMAGE DEVICE HAVING COLOR FILTER

CROSS-REFERENCE TO RELATED APPLICATION

This application claims priority to Korean Patent Application No. 10-2004-0092791, filed on Nov. 13, 2004, the disclosure of which is incorporated herein in its entirety by reference.

TECHNICAL FIELD

The present disclosure relates to an image device, and more particularly, to an image device having a color filter that reduces a difference of saturation luminance among color filter elements.

BACKGROUND

Image devices convert optical images into digital data. The image devices generate digital data of the optical images by converting the optical images into analog electrical signals and then by converting the analog electrical signals into digital electrical signals. Image devices are used, for example, in digital cameras to sense optical images and to convert the optical images into digital data.

The image devices include an image sensor and a color filter. The image sensor converts optical images into electrical signals. The color filter filters light by colors before the light is incident on the image sensor. The image sensor senses a luminance of the incident light. The image sensor includes photodiodes for generating electrical signals based on the luminance of the incident light. The image sensor including the photodiodes may be, for example, a complementary metal oxide semiconductor (CMOS) image sensor or a charged coupled device (CCD) image sensor.

Each pixel includes a photodiode. The image sensor includes a plurality of photodiodes. Hereinafter, a pixel is referred to as red, green, blue or cyan pixel based on the color represented by the pixel. Red, green, blue and cyan pixels include red, green, blue and cyan color filter elements, respectively. An array of the red, green and blue pixels are disposed in a mosaic form, e.g., a Bayer pattern disclosed in, for example, U.S. Pat. No. 3,971,065.

FIG. 1 is a view illustrating a conventional color filter having red, green and blue pixels arranged in the Bayer pattern. Photodiodes of an image sensor are disposed below each of the R, G, and B color filter elements to sense the luminance of light incident on the photodiodes that are filtered by the color filter elements.

Each of the photodiodes generates analog electrical signals based on the luminance of the sensed light, and the analog electrical signals are color-processed to obtain digital data of an image. The analog electrical signals obtained by the photodiodes are converted into digital electrical signals via an analog-to-digital converter (ADC), and the digital electrical signals are color-processed to obtain digital data of the image.

Output signal values of the photodiodes that sense light from the B color filter elements are much less than output signal values of the photodiodes that sense light from the R or G color filter elements when using the color filter having the conventional Bayer pattern. That is, when measuring output signal values of the photodiodes that sense light from the B, R or G color filter element while increasing luminance of a white light source, sensitivity of photodiodes to light from the B color element is smaller than the sensitivity of photodiodes to light from the R or G color element.

FIG. 2 is a graph illustrating the output signals of the photodiodes of R, G and B pixels. Referring to FIG. 2, when the output signals of the photodiodes of each the R, G and B pixels are measured while increasing the luminance of the white light source, the sensitivity of photodiodes to light from the B color filter is about half of that of the R or G color filter. The output signal values of the R or G pixel stop increasing at a luminance at which the output signal values of the R or G pixel are saturated. The output signals at or beyond such luminance level cannot be used as output signals. Therefore, the maximum output signal of the B pixel is about half of that of the R or G pixel.

Each of the R, G, and B pixels can be designed to have the same saturation output to overcome the weak sensitivity of photodiodes to light from the B color filter. However, the sensitivity of photodiodes to light from the B color filter is about half of that of the R or G color filter as illustrated in FIG. 2. Therefore, there is a difference in the saturation output signal values that can be actually used as an output signal due to a difference in saturation luminance between the color elements. If a number of the saturation output signal that is converted into electrons is denoted as N, shot noise is denoted as $\sqrt{N}$. The maximum signal-to-noise ratio (S/N) is 10 log N. That is, the maximum S/N depends directly on the number of electrons of the saturation output signals that are used as signals. Even if the output signals of the photodiodes that sense light from the B color filter is used after amplifying it by 2 times to equalize the sensitivity of photodiodes to light from the B color filter to the sensitivity of photodiodes to light from the R and G color filters, the same S/N can be maintained because the number of electrons of the output signals of the photodiodes that sense light from B color filter remains the same.

If a noise floor per pixel channel is stable and the sensitivity to light from the B color filter is ½ of that of R or G color filter, the saturation output of the photodiodes that sense light from the B color filter with respect to the white light; source is ½ of the saturation output of the photodiodes that sense light from the R and G color filters. Accordingly, a dynamic range limit is limited by B pixel. Since the dynamic range limit of the image sensor is decreased, the sensitivity to light from the B color filter needs to be increased to improve the S/N.

SUMMARY OF THE INVENTION

In general, exemplary embodiments of the present invention include an image device having a color filter that reduces a saturation luminance difference among color elements with respect to white color light.

In an exemplary embodiment of the present invention, an image device comprises an image sensor including an array of photodiodes for converting an optical image into electrical signals, a color filter comprising an array of red, green and cyan filter elements disposed opposite the array of photodiodes, and a color processor for color processing the electrical signals.

A saturation output of a red or green pixel can be determined at a luminance of white light at which a saturated output of cyan pixel is sensed. The output of green pixel at the luminance of the white light where the saturated output of cyan pixel is sensed is about ⅔ the saturated output of cyan pixel when sensitivity to the blue filter element is about ½ of the sensitivity to the green filter element.

In another exemplary embodiment of the present invention, an image device comprises a color filter comprising an array of red, green and cyan filter elements disposed in a Bayer pattern array to reduce a difference in sensitivity among color filter elements, and an image sensor disposed under the color filter.

In still another exemplary embodiment of the present invention, a method of color processing comprises detecting a luminance of light filtered by a color filter comprising an array of red, green and cyan filter elements disposed in a Bayer pattern, outputting electrical signals based on the luminance of light, converting the electrical signals into digital signals via an analog-to-digital converter, and outputting the digital signals to a color processor for color processing.

These and other exemplary embodiments, aspects, features and advantages of the present invention will become apparent from the following detailed description of exemplary embodiments, which is to be read in connection with the accompanying drawings.

DETAILED DESCRIPTION OF EXEMPLARY EMBODIMENTS

Exemplary embodiments of the present invention will now be described more fully hereinafter below with reference to the accompanying drawings. This invention may, however, be embodied in different forms and should not be construed as limited to the exemplary embodiments set forth herein. Rather, these exemplary embodiments are provided so that this disclosure will be through and complete, and will fully convey the scope of the invention to those skilled in the art. In an exemplary embodiment of the present invention, a color filter which substitutes a blue (B) color filter element with a cyan (Cy) color filter element is provided. A conventional color filter comprises a red (R), a green (G) and a blue (B) color filter elements. In an exemplary embodiment of the present invention, a color filter comprising R, G, and Cy color filter elements are arranged in a mosaic pattern based on a Bayer pattern array.

A sensitivity of photodiode that sense light from the Cy filter element is about 1.5 times higher than that of the G filter element since Cy is equal to G+B. If a saturation luminance is decided based on the sensitivity to light from the Cy filter element, the G pixel has a saturation output that is about ⅔ of the Cy pixel. In a conventional technology, if the number of maximum saturation electrons is N, the minimum saturation signal output depends on B pixel and is N/2. In an exemplary embodiment of the present invention, the minimum saturation signal output depends on G pixel is 2N/3. Therefore, there is a maximum of 10 log(4/3)=1.25 dB gain regarding a signal-to-noise ratio (S/N). B is equal to Cy−G. Accordingly, if a process of obtaining a signal value of the B pixel before a color signal processing (i.e., color processing) is performed in exemplary embodiments of the present invention, a conventional color signal processing of R, G, and B pixels can be used.

If the transmittance rate or spectrum of the Cy color filter element is adjusted, the sensitivity to light from Cy color filter element can be adjusted to be the same as the sensitivity to light from G color filter element. In this case, the maximum S/N can be obtained. For the color signal process of R, G, and B pixels, signal values of B pixel need to be obtained in advance from output of Cy pixel considering the altered transmittance rate and the altered spectrum.

Figure 3:
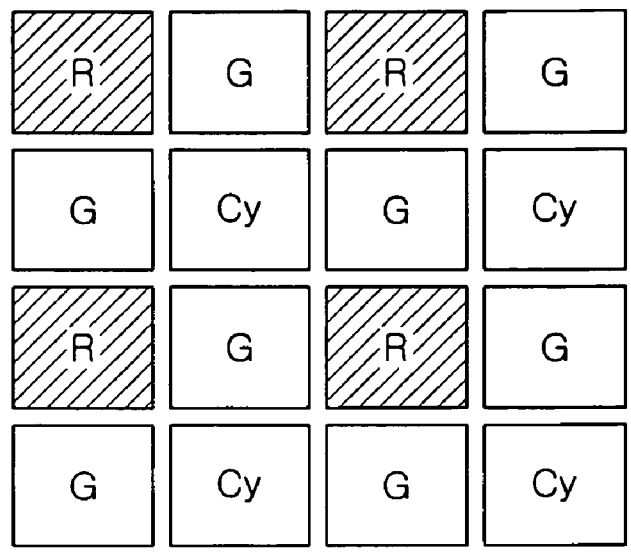
FIG. 3 is a view illustrating a color filter arranged in a Bayer pattern according to an exemplary embodiment of the present invention.

FIG. 3 is a view illustrating a color filter 20 (show in FIG. 4) arranged in the Bayer pattern according to an exemplary embodiment of the present invention. Referring to FIG. 3, the color filter 20 includes three colors of filter elements, i.e., red, green and blue. The arrangement of each of the color filter elements follows the Bayer pattern array. The sensitivity ratio among each of the R, G, and Cy pixels having R, G and Cy color filter elements respectively can be 1:1:1.5. Preferably, the difference from each other is not higher than 40%.

Figure 4:
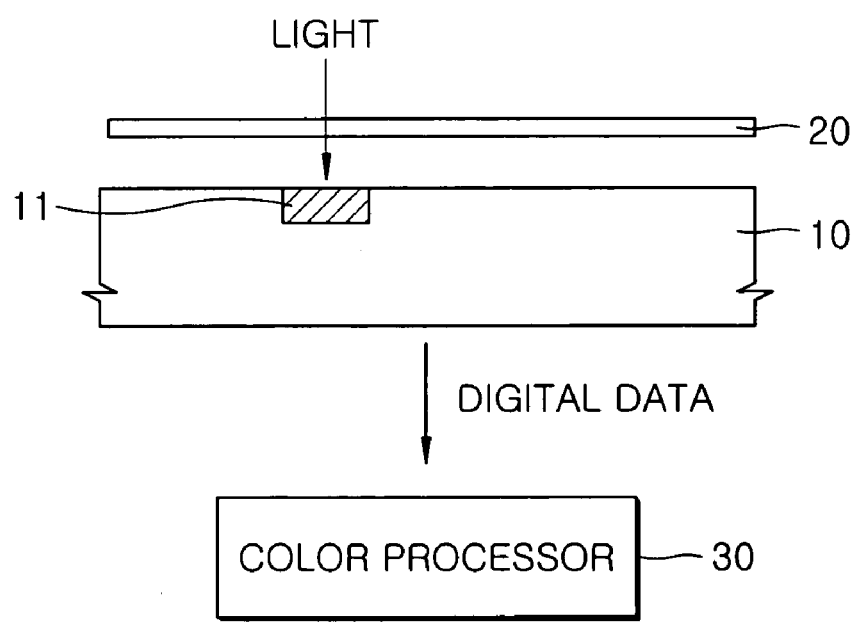
FIG. 4 is a schematic diagram of an image device according to an exemplary embodiment of the present invention.

FIG. 4 is a schematic diagram of an image device according to an exemplary embodiment of the present invention. Referring to FIG. 4, the image device includes an image sensor 10 which converts optical image into electrical signals. The image sensor 10 includes a plurality of photodiodes 11 which output the electrical signals based on an amount of incident light on the image sensor 10. The photodiodes 11 are disposed to convert the optical image into the electrical signals. The electrical signals, which are analog signals, are converted into digital data signals via an analog-to-digital converter (ADC) (not shown) included in the image device 10. Then the digital data signals are output to a color processor 30 for processing color signals. The image device can operate in a progressive scan method. That is, the optical signals sensed by the photodiodes 11 are sequentially output to the color processor 30 to be color signal processed (or color processed), and the color processed signals are output as the digital data signals.

The color filter 20 is disposed on the image sensor 10 so that the R, G, and Cy filter elements are positioned opposite the photodiodes 11. The photodiodes 11 of each unit pixel are disposed below each of the R, G, and Cy filter elements. The luminance of light incident on the photodiodes 11 is sensed by the photodiodes 11 after being filtered by the R, G, and Cy filter elements.

Since the Cy filter element is used instead of the B filter element in an exemplary embodiment of the present invention, output signals of the Cy pixel cannot be directly used for the color processing to form an image. Since the image is formed by color processing with R, G, and B color components, the process of obtaining a signal value to B pixel can be further included in the color processing. Signal values of B pixel can be obtained by performing Cy−G. Accordingly, if the process of obtaining the signal values of B pixel is performed before the color signal processing (i.e., color processing) in an embodiment of the present invention, a color signal processing regarding R, G, and B pixels can be performed as in the conventional art.

The transmittance rate or spectrum of the Cy filter element can be altered to adjust the sensitivity of photodiode to the light from Cy filter element to be same as the sensitivity to the light from G filter element. In this case, the maximum S/N can be obtained. For the color signal processing for R, G, and B pixels, the altered transmittance rate and the spectrum of the Cy filter element needs to be considered when obtaining signal values of B pixels from the output signal of the sensed Cy pixels.

Figure 5:
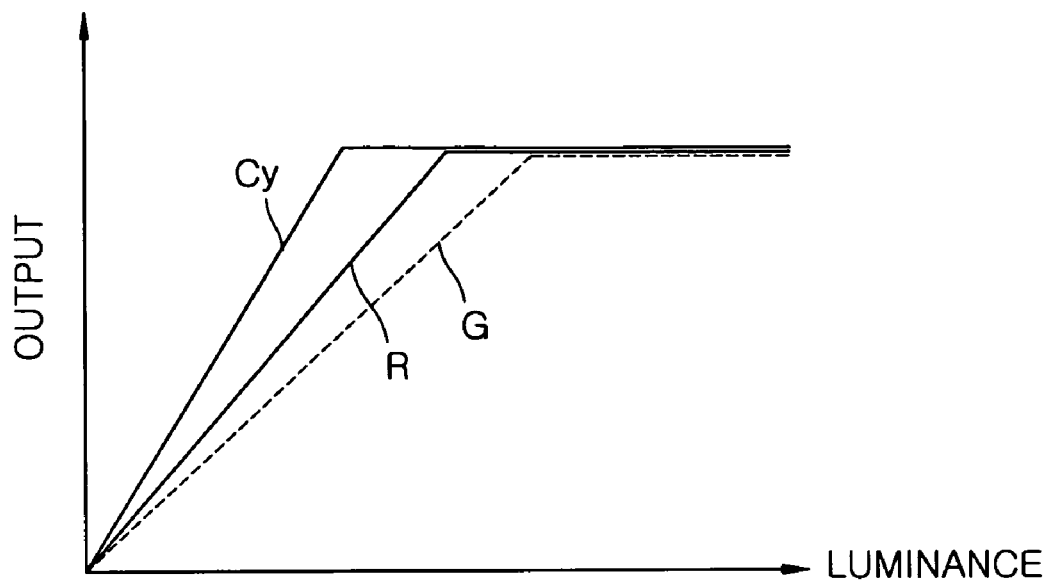
FIG. 5 is a graph for explaining output signals of photodiodes corresponding to each color elements of the color filter of FIG. 3.

FIG. 5 is a graph for explaining output signals of the photodiodes 11 corresponding to each of the color elements R, G, and Cy of the color filter 20. Referring to FIG. 5, if output signals of the photodiodes 11 corresponding to each of R, G, and Cy pixels are measured while increasing the luminance of the white light source, the sensitivity of photodiodes to the light from Cy filter element is detected as a saturation value at a lower luminance than that of R or G pixel.

Figure 1:
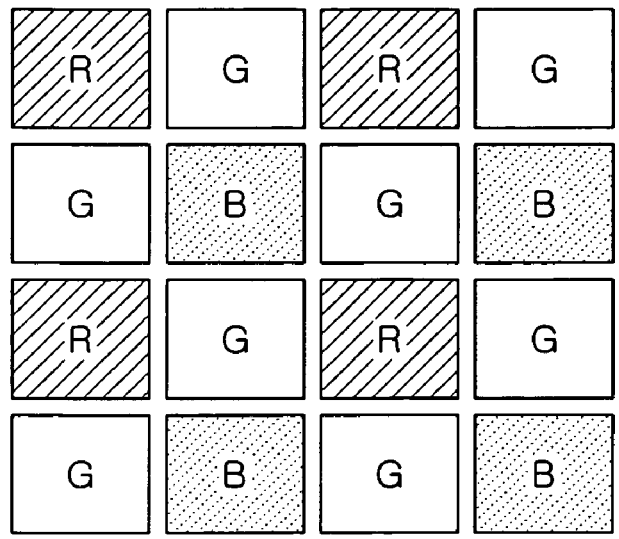
FIG. 1 is a view illustrating a conventional color filter arranged in a Bayer pattern.
Figure 2:
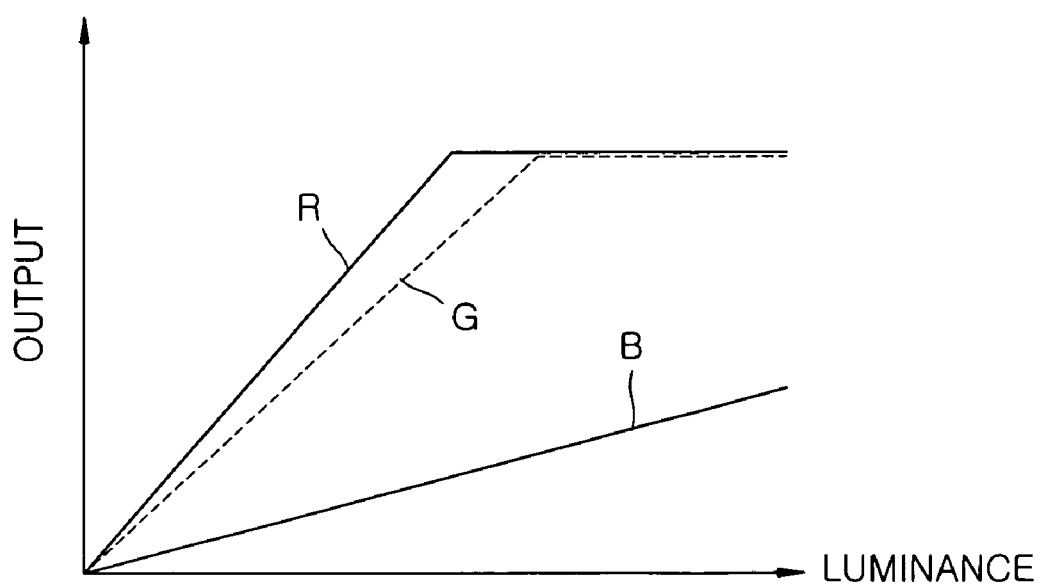
FIG. 2 is a graph illustrating output signals of photodiodes by colors.

As stated above, the sensitivity of photodiode to the light from Cy filter element is about 1.5 times higher than that of G filter element because Cy is equal to G+B. If the saturation luminance is decided based on the sensitivity to the light from Cy filter element, then R or G pixel has a saturation signal output that is about ⅔ of the saturation output of Cy pixel as illustrated in FIG. 5, assuming that the saturation signal outputs of R and G pixels are the same. Thus, there is a maximum of 10 log(4/3)=1.25 dB gain in the S/N. The S/N in one exemplary embodiment of the present invention is improved compared to that of the conventional technology as illustrated in FIG. 2.

Since the wavelength derived from B filter element is shorter than the wavelength derived from green or red color filter, light from blue color filter is absorbed much at a p⁺-doped layer disposed on top of an n-doped layer, which accumulates light-excited electrons, within a p-type well of a semiconductor of the photodiodes 11 (see FIG. 4). As a result, less light from B color filter reach the n-doped layer which senses light. Thus, the p⁺-doped layer may prevent heat production. Such photodiodes can be called as a hole accumulated diode sensor, a surface shield diode, or a surface pinned diode. The light from B color filter absorbed in the p⁺-doped layer induces the recombination of electrons-holes, thereby making the light from B color filter undetectable by the photodiodes 11. Accordingly, the sensitivity or the signal output of photodiode to the wavelength from blue color filter is lowered. In one exemplary embodiment of the present invention, such problem does not occur by using the Cy filter element instead of the B filter element. By using the Cy filter element, the dynamic range limit can be extended, thereby improving the S/N.

Figure 6:
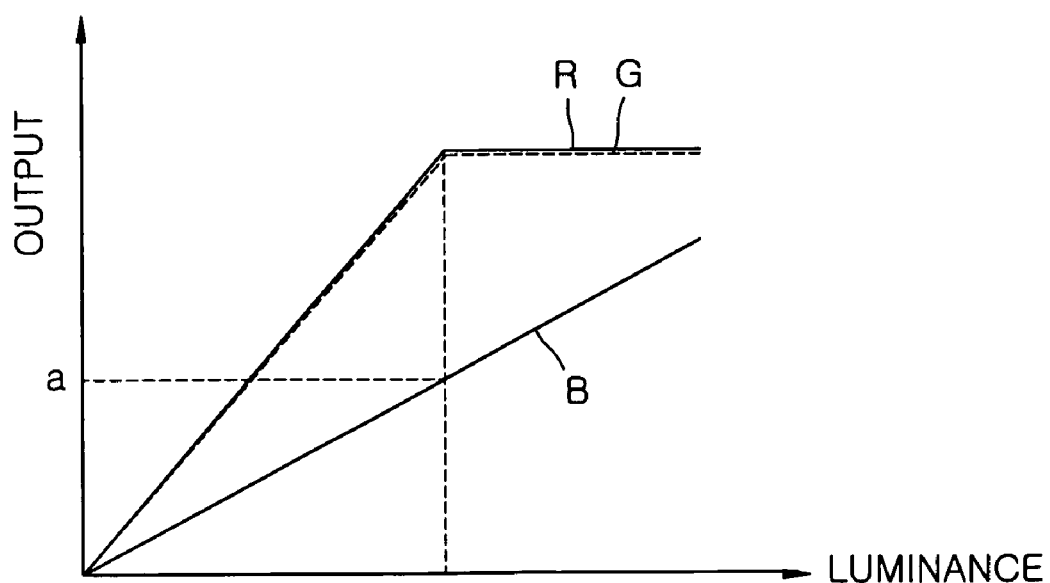
FIG. 6 is a graph for explaining the restriction of a dynamic range limit regarding sensitivity to light from blue color filter.
Figure 7:
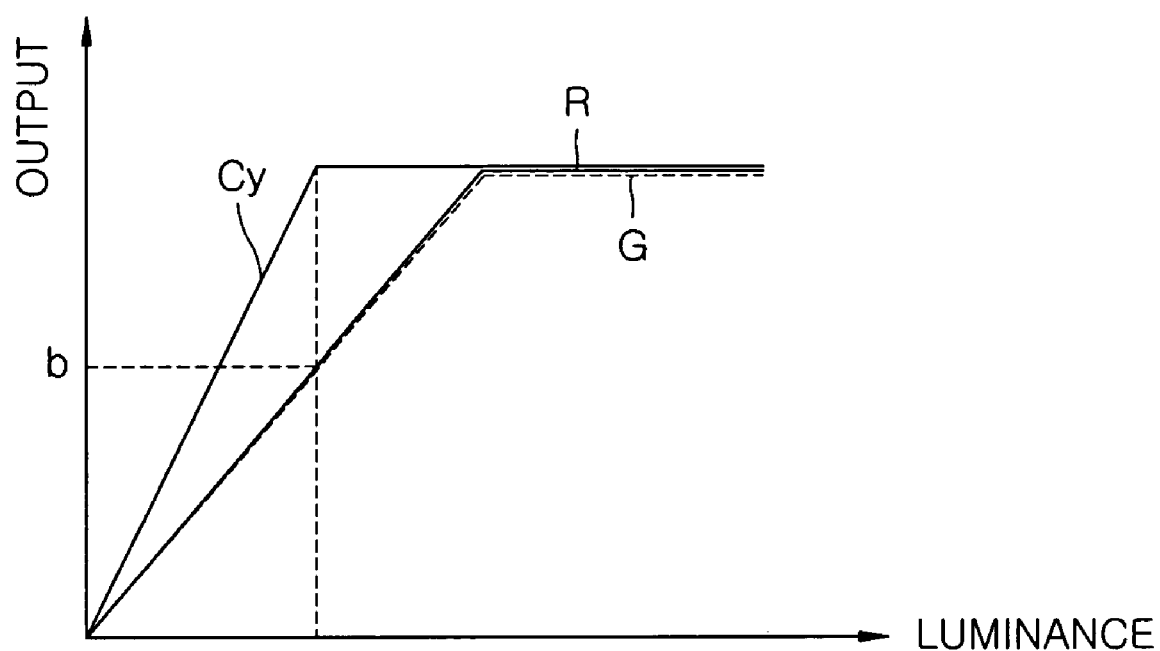
FIG. 7 is a graph for explaining extending a dynamic range limit according to an exemplary embodiment of the present invention.

FIG. 6 is a graph for explaining a dynamic range limit regarding sensitivity of photodiode to the light from B color filter. FIG. 7 is a graph for explaining an effect of extending a dynamic range limit according to an exemplary embodiment of the present invention. Referring to FIG. 6, if noise floor per pixel channels are the same and sensitivity to the light from B color filter is about ½ of that of R and G color filters, the dynamic range limit depends on a signal output a of the B pixel at a luminance of the saturation output point of the R and G pixels. The saturation output of the B pixel is limited to about ½ of the saturation output of the R and G pixels at the saturation output luminance of the R and G pixels in the conventional art. The signal output value a of the B pixel at the luminance of the saturation output point of the R and G pixels is ½ of the saturation output value of R and G pixels. Since the dynamic range limit is (saturation output value/2)/noise floor, the dynamic range limit becomes narrow.

Referring to FIG. 7, in an exemplary embodiment, since the saturation output regarding the white light is G+B=3/2G, the saturation output of the R and G pixels is limited to about ⅔ the saturation output of Cy pixel at the saturation output luminance of the Cy pixel. Therefore, the dynamic range limit depends on a signal output b regarding the G pixel at the luminance of the saturation output point of the Cy pixel. Since the signal output b regarding the G (or R) pixel at the luminance of the saturation output point of the Cy pixel is about ⅔ of the saturation output value, the dynamic range limit is (saturation output value×⅔)/noise floor. The dynamic range limit is extended approximately 1.33 times compared to the conventional dynamic range limit.

As described above, a sensitivity ratio among each of the color elements may be less than 1.5 when a color filter array in the Bayer pattern includes Cy, R, and G color filters.

Although exemplary embodiments have been described herein with reference to the accompanying drawings, it is to be understood that the present invention is not limited to such exemplary embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An image device comprising: an image sensor including an array of photodiodes for converting an optical image into electrical signals;
   a color filter comprising an array of red, green and cyan filter elements disposed opposite the array of photodiodes; and
   a color processor for color processing the electrical signals;
   wherein a saturation output of a red or green pixel is determined at a luminance of white light at which a saturated output of cyan pixel is sensed; and
   wherein the output of green pixel at the luminance of the white light where the saturated output of cyan pixel is sensed is about ⅔ the saturated output of cyan pixel when sensitivity to the blue filter element is about ½ of the sensitivity to the green filter element.

2. The image device of claim 1, wherein the image sensor senses the electrical signals, which are analog signals, using a progressive scan method.

3. The image device of claim 1, the image sensor further comprises a converter which converts the electrical signals into digital signals.

4. The image device of claim 1, wherein the color processor subtracts signal values regarding the green pixel from signal values regarding the cyan pixel among digital signals to obtain signal values regarding blue pixel, and color processes the digital signal values to obtain image data.

5. A method of color processing comprising:
   detecting a luminance of light filtered by a color filter comprising an array of red, green and cyan filter elements disposed in a Bayer pattern;
   outputting electrical signals based on the luminance of light;
   converting the electrical signals into digital signals via an analog-to-digital converter; and
   outputting the digital signals to a color processor for color processing;
      wherein a saturation output of a red or green pixel is determined at a luminance of white light at which a saturated output of cyan pixel is sensed; and
      wherein the output of green pixel at the luminance of the white light where the saturated output of cyan pixel is sensed is about ⅔ the saturated output of cyan pixel when sensitivity to the blue filter element is about ½ of the sensitivity to the green filter element.

6. The method of claim 5, wherein the color processor subtracts signal values regarding the green pixel from signal values regarding the cyan pixel among digital signals to obtain signal values regarding blue pixel, and color processes the digital signal values to obtain image data.

* * * * *